US 6,674,997 B2

(12) United States Patent
Hoctor

(10) Patent No.: US 6,674,997 B2
(45) Date of Patent: Jan. 6, 2004

(54) AM BAND TRANSMISSION USING MULTI-TONE MODULATION

(75) Inventor: Ralph Thomas Hoctor, Saratoga, NY (US)

(73) Assignee: General Electric Company, Niskayuna, NY (US)

( * ) Notice: Subject to any disclaimer, the term of this patent is extended or adjusted under 35 U.S.C. 154(b) by 294 days.

(21) Appl. No.: 09/682,387

(22) Filed: Aug. 28, 2001

(65) Prior Publication Data

US 2003/0054777 A1 Mar. 20, 2003

(51) Int. Cl.[7] .............................................. H04M 11/00
(52) U.S. Cl. ................................... 455/108; 379/106.03
(58) Field of Search ................................ 455/108, 466, 455/91, 39, 41.1, 41.2, 507, 67.11, 66.1, 344; 379/106.03, 10.01, 106.04–106.11; 340/870.04, 870.02

(56) References Cited

U.S. PATENT DOCUMENTS

| | | | | |
|---|---|---|---|---|
| 5,438,329 A | * | 8/1995 | Gastouniotis et al. | 340/870.02 |
| 5,563,906 A | | 10/1996 | Hershey et al. | |
| 5,619,192 A | | 4/1997 | Ayala | |
| 5,708,963 A | * | 1/1998 | Mobley et al. | 455/12.1 |
| 5,809,395 A | * | 9/1998 | Hamilton-Piercy et al. | 725/106 |
| 5,905,947 A | * | 5/1999 | Stein | 455/90.3 |
| 6,014,089 A | * | 1/2000 | Tracy et al. | 340/870.02 |
| 6,333,975 B1 | * | 12/2001 | Brunn et al. | 379/106.03 |
| 6,363,335 B1 | * | 3/2002 | Monroe et al. | 703/21 |
| 6,477,386 B1 | * | 11/2002 | Giles | 455/517 |
| 6,564,056 B1 | * | 5/2003 | Fitzgerald | 340/5.1 |

OTHER PUBLICATIONS

J. E. Hershey, et al, "Modest But Useful Erasure Technique for DPSK", Electronic Letters, Jan. 2, 1997, vol. 33, No. 1, pp. 21–22.

* cited by examiner

*Primary Examiner*—Pablo N Tran
(74) *Attorney, Agent, or Firm*—John F. Thompson; Patrick K. Patnode

(57) ABSTRACT

A communication system for communicating utility data from a utility distribution network comprises a transmitter for transmitting the utility data. The transmitter comprises a processor that modulates the utility data into a plurality of carrier frequencies. A modulator is connected to the processor and receives the modulated utility data. The modulator modulates the modulated utility data in the AM frequency band forming multi-tone modulated data wherein the transmitter transmits the multi-tone modulated data/transmitted information in the AM frequency band. The communication system also comprises a receiver that receives the transmitted information. The receiver comprises a demodulator that receives the transmitted information and demodulates the transmitted information into a received signal. A processor is connected to the demodulator and receives the demodulated information.

27 Claims, 5 Drawing Sheets

AM BAND TRANSMISSION USING MULTI-TONE MODULATION

BACKGROUND OF THE INVENTION

This invention relates generally to a communication system and more particularly, to a system for communicating commands and data between a central station and a plurality of electricity meters.

Typically, utility companies have service personnel visit customer sites to read electricity meters or other meters (utility meters) at the sites to determine the amount of electrical energy consumed for billing purposes. This meter reading technique is cumbersome and time consuming particularly when there are many consumer sites over a large geographic area.

As a result of these difficulties involved in reading utility meters, many systems have been proposed for automated meter reading (AMR) operations. The AMR systems enable utility companies to more easily obtain energy consumption data from many different sites without having service personnel visit each consumer site. Some AMR systems use power line communications. Other AMR systems use radio frequency communications. Still other AMR systems use a hybrid approach that involves both power line communication and radio frequency communication. Typically, most AMR systems transmit data and commands between a central station and the utility meters.

In particular, some AMR communication systems implement radio frequency communications based on the unlicensed use of the 902–928 MHz ISM band. However, the ISM band is becoming crowded with users, and as a result, interference is becoming a problem. Additionally, fixed-network AMR systems using the high frequencies, such as the ISM band, encounter problems relating to the placement of concentrators because the high frequency signals can be transmitted over relatively small distances. As a result, these high frequency communication networks may require the placement of many concentrators. Thus, the implementation of these AMR systems becomes less economically feasible. As such, there is a desire to provide AMR systems that have the flexibility of radio frequency communications and/or a hybrid power line/radio frequency communications and that eliminates problems associated with communication in the ISM band, such as, for example, placement of many concentrators.

The commercial amplitude modulation (AM) band is an alternative candidate for low data rate, unlicensed transmissions. Unlicensed transmitters in the AM band (510 kHz to 1705 kHz) are limited to 100 mW input to the final transmitter stage and transmit antenna length of less than three meters. Commercial AM stations are spaced 10 kHz apart with no guard bands, but there are typically many unused station frequencies in a given region, and many AM stations transmit signals whose bandwidth is less than that of the allocated band. These facts suggest that an interference-free part of the AM band could be found for data transmission at any given time. It should be noted, however, that interference from AM stations will vary with the time of day and with atmospheric conditions.

Another aspect of radio communication which should be considered is multipath signal cancellation. The wavelengths in the AM band range from about 600 feet to about 2000 feet. Propagation path length differences equal to some small multiple of the wavelength, plus or minus half a wavelength, will cause some degree of cancellation of the signal at the receiver. This effect can be mitigated by increasing the transmitted power or, alternatively, the bandwidth of the transmitted signal. One well-known way of increasing the signal's bandwidth is through the use of multi-tone modulation (MTM). Further, MTM signals can be received adaptively in such a way as to maximize the signal-to-noise ration of the reception. This technique has been called adaptive maximal ratio combining.

SUMMARY OF THE INVENTION

The problem of using long-range RF to gather utility meter-reading and other data from local collection points is addressed by unlicensed transmission in the AM radio band. The problem of interference from primary users of that band is addressed by the use of multi-tone modulation, which allows the receiver to selectively use for demodulation those parts of the transmission that lie in clear portions of the band. This enables a one-way transmission in the AM band without prior knowledge on the part of the transmitter as to where in the band interfering transmissions lie. For a two-way transmission in the AM band, it provides a signaling scheme that can be dynamically optimized to suit the observed state of the channel. This modulation also overcomes any multipath signal cancellation that might attenuate a transmission comprised of a single narrowband signal.

In one representative embodiment, a communication system for communicating utility data from a utility distribution network is provided. The communication system comprises a transmitter for transmitting the utility data. The transmitter comprises a digital signal processor that modulates the utility data into a plurality of carrier frequencies. These frequencies are spaced at an integer multiple of the spacing of AM radio stations, and they fall midway between the center frequencies of the standard AM radio station bands. A digital-to-analog converter is connected to the digital signal processor and converts the modulated utility data into an analog signal. A wide band radio frequency (RF) modulator is connected to the digital-to-analog converter and receives the analog signal. The wide band RF modulator modulates the analog signal in the AM frequency band, and the transmitter transmits the AM modulated analog signal in the AM frequency band. In the representative embodiment, the communication system also comprises a receiver. The receiver comprises a wide band radio frequency (RF) demodulator that receives the transmitted AM modulated analog signal. The wide band RF demodulator demodulates the AM modulated analog signal into a received analog signal. An analog-to-digital converter is connected to the wide band RF demodulator and converts the received analog signal to received digital data. A digital signal processor is connected to the analog-to-digital converter and receives the received digital data. The digital signal processor constructs the received digital data forming received utility data.

DETAILED DESCRIPTION

Figure 1:
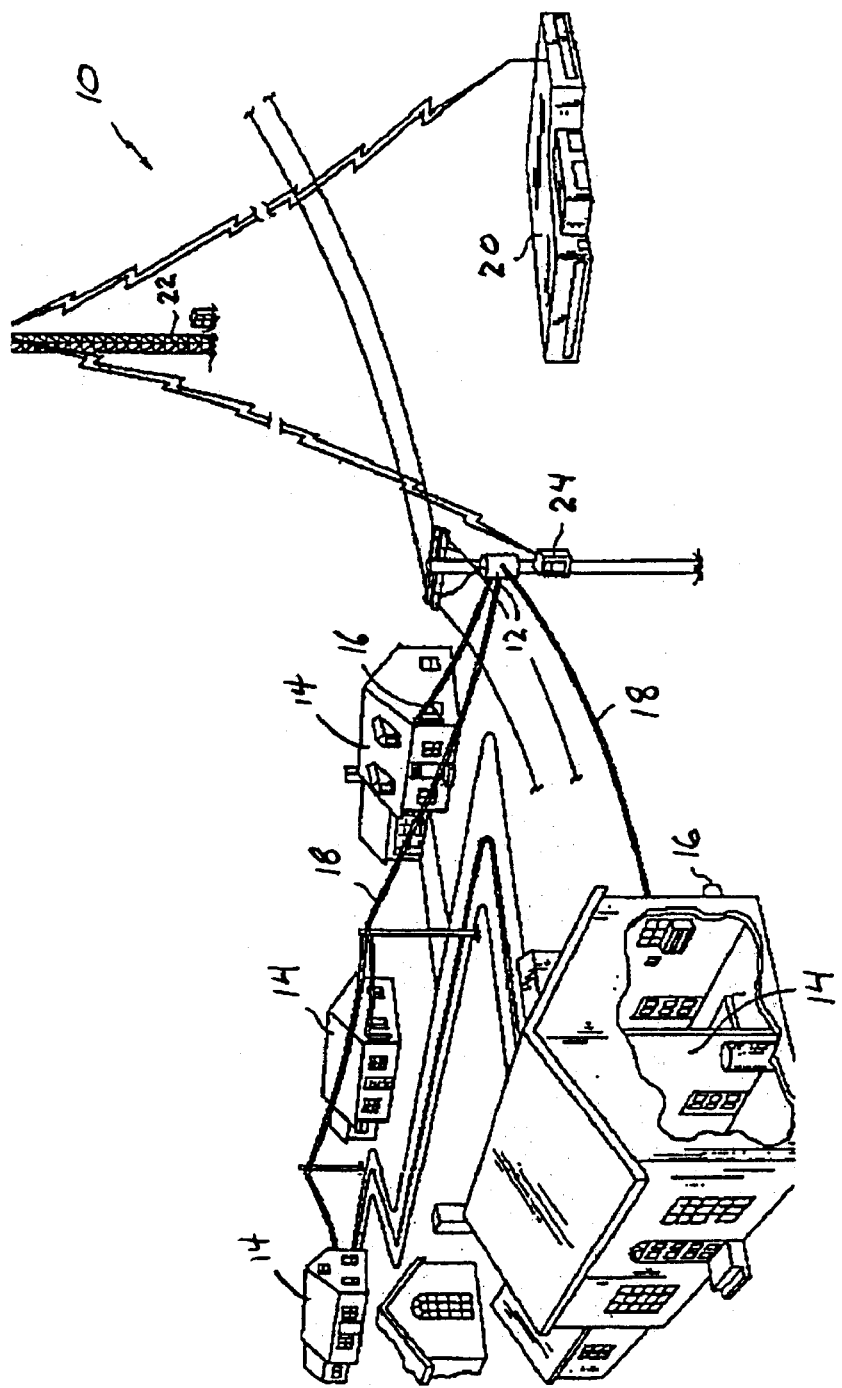
FIG. 1 is a highly simplified perspective view of one representative embodiment of an electrical power distribution network and a communication system.

In FIG. 1, one representative embodiment of an electrical power distribution network and/or a utility distribution network with a communication system 10 includes a plurality of distribution transformers 12. A secondary side of each distribution transformer 12 is connected to a plurality of electrical loads 14. In one embodiment, the plurality of electrical loads 14 can comprise, such as, for example, residential homes, businesses and factories that consume commodities supplied by a utility company, such as, for example electricity, natural gas, propane and/or water. A meter device 16 is coupled to each of the plurality of electrical loads 14 for measuring the consumption of the commodity supplied to the corresponding load 14 by the utility company. In one embodiment, the meter device 16 comprises an electronic type watt-hour meter. It should be appreciated that the meter device 16, in other embodiments, measures the consumption of commodities, such as, for example, electricity, natural gas, propane and/or water.

In one embodiment, the communication system 10 comprises a hybrid power line communication system. In this embodiment, commands and data are transmitted via power lines 18 to and from the meter devices 16. As such, in this embodiment the power lines 18 conduct current from distribution transformers 12 to the electrical loads 14 and also serve as a communications bus.

The communication system 10 also includes a central control station 20 also referred to as a system control center. In one embodiment, the central control station 20 transmits commands to a radio tower 22. In one embodiment, the commands are transmitted from central control station 20 to the radio tower 22 using radio frequency (RF) signals, and the radio tower 22 thereafter transmits the commands to a plurality of nodes 24 using RF signals. The meter device 16 receives the commands from at least one of the plurality of nodes 24. In addition, the meter device 16 also transmits data back to the central control station 20 via the radio tower 22 and through the plurality of nodes 24. It should be appreciated that the radio tower 22 can comprise a plurality of radio towers. Also, in another embodiment, the radio tower 22 is hardwire connected to the central control station 20 so that the commands can be supplied to the radio tower 22 via a hardwire connection. Further, it should also be appreciated, in other embodiments, that the commands are transmitted using other techniques, such as, for example, microwave signals, satellite signals, ultra-high bandwidth signals, cellular telephone signals, personal communication system (PCS) signals, or other communication system signals.

Each of the plurality of nodes 24 includes a remote local relay module associated with a distribution transformer 12. In one embodiment using power line communication, each of the plurality of nodes 24 receives signals from the tower 22 and transmits the received signal via the power line 18 to the meter device 16 connected to the electrical load 14 that is also connected to the distribution transformer 12.

In one embodiment, the central control station 20 communicates directly with the meter device 16 without using power line communications. In this embodiment, the central control station 20 transmits commands to the radio tower 22, and the commands are, then, transmitted to the meter device 16. In addition, the meter device 16 also transmits commands and data back to the central control station 20 via the radio tower 22. It should be appreciated that, in this embodiment, that the radio tower 22 comprises a plurality of radio towers. Also, in another embodiment, the radio tower 22 is hardwire connected to the central control station 20 so that the commands are supplied to the radio tower 22 via a hardwire connection. In one embodiment, commands and data can be transmitted to and from the meter devices 16 via a plurality of nodes 24 that transmit and receive the commands and data from the central control station 20 via the radio tower 22. Further, it should also be appreciated that, in other embodiments, the commands are transmitted using other techniques, such as, for example, microwave signals, satellite signals, ultra-high bandwidth signals, cellular telephone signals, personal communication system (PCS) signals, or other communication system signals.

In another embodiment, the meter devices 16 communicate with the central control station 20 in a one way configuration. In this embodiment, the meter devices 16 and communicate with or without using power line communications. Specifically, the meter devices 16 can be instructed or programmed to transmit commands or data to the central control station 20 at a predetermined time or at a predetermined time interval. Further in one embodiment, the meter devices 16 transmit commands or data to central control station 20 at the predetermined time or at the predetermined time interval to the radio tower 22 and the commands or data is transmitted to the central control station 20. It should be appreciated that the commands or data can be transmitted from the meter device 16 directly to the radio tower 22 and the central control station 20. It should be appreciated that, in one embodiment, that the radio tower 22 comprises a plurality of radio towers. Also, in another embodiment, the radio tower 22 is hardwire connected to the central control station 20 so that the commands are supplied from the radio tower 22 to the central control station 20 via a hardwire connection. In another embodiment, commands and data can be transmitted from the meter devices 16 via a plurality of nodes 24 that transmit the commands or data to the central control station 20 via the radio tower 22. Further, it should also be appreciated that, in other embodiments, the commands are transmitted using other techniques, such as, for example, microwave signals, satellite signals, ultra-high bandwidth signals, cellular telephone signals, personal communication system (PCS) signals, or other communication system signals.

Figure 2:
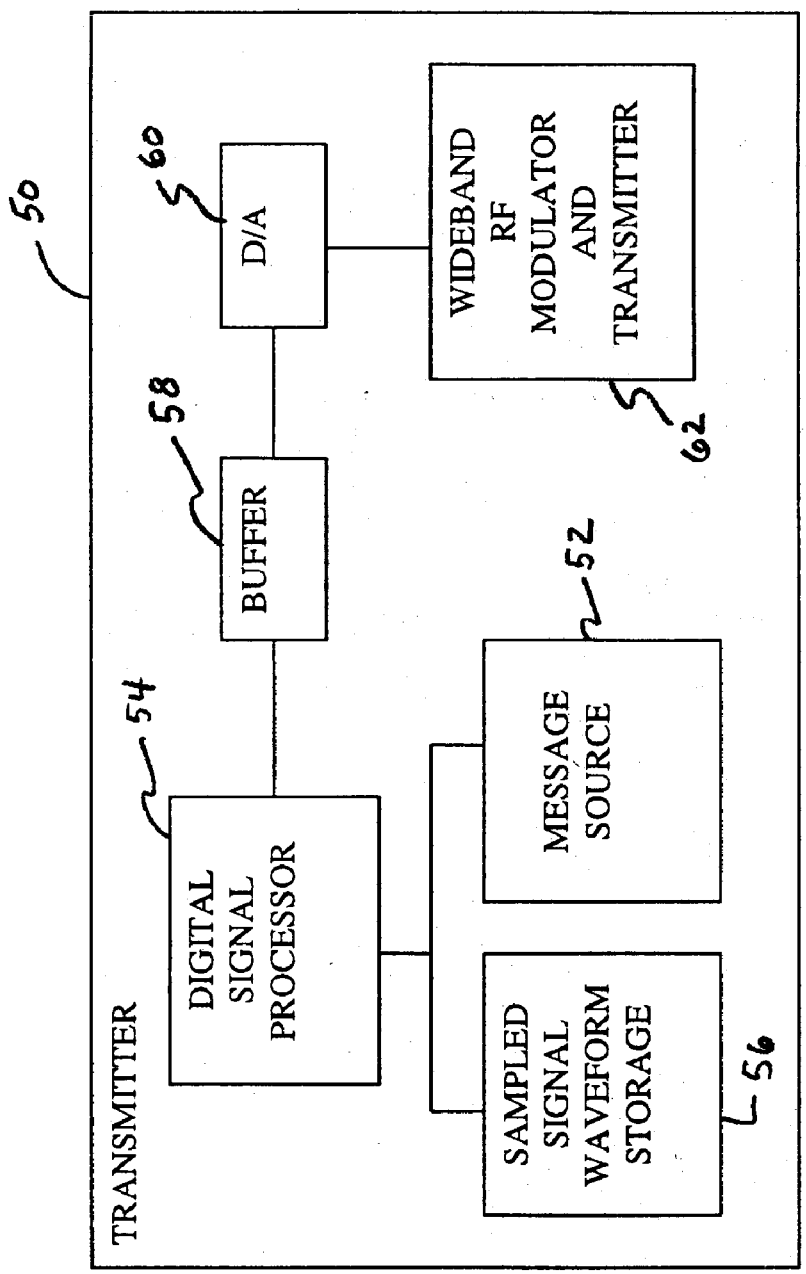
FIG. 2 is a block diagram of one representative embodiment of a transmitter.

In FIG. 2, a transmitter 50 includes a message source 52 connected to a digital signal processor (DSP) 54. In one embodiment, at least one transmitter 50 is included in each of the central control station 20, radio tower 22, and nodes 24 of the communication system 10 (FIG. 1). Also, in one representative embodiment, the message source 52 comprises a memory device, such as, for example, a random access memory (RAM) or a programmable read only memory (PROM). In even other representative embodiments, the digital signal processor 54 comprises a processor, such as for example, general purpose computer or a microprocessor. It should be appreciated that the digital signal processor 54 encompasses all processors that are suitable for use in connection with radio frequency (RF) signaling. In one embodiment, when transmitter 50 is included in the central control station 20, the message source 52 receives data to be transmitted from a remotely located server coupled to message source 52 via a network. In another embodiment, when the transmitter 50 is included in the radio tower 22, the data is supplied to the message source 52 via a processor module that receives the transmitted signals and provides the message source 52 with the data to be retransmitted. In even another embodiment, when the transmitter 50 is included in the node 24, the message source 52 receives data from a network, such as, for example, a power line communication network or a radio frequency communication network. In yet another embodiment, when the transmitter 50 is included in the meter device 16, the message source 52 receives data from a network, such as, for example, a power line communication network or a radio frequency communication network. It should be appreciated that the transmitter 50 can also comprise an antenna (not shown) to assist in the transmission of the RF signals.

Also shown in FIG. 2, the digital signal processor 54 is also connected to a storage device 58 and a sampled signal waveform storage 56. It should also be appreciated that, in one representative embodiment, each of the storage device 58 and the sampled signal waveform storage 56 comprise a memory device, such as, for example, a random access memory (RAM) or a programmable read only memory (PROM). It should also be appreciated that, in one representative embodiment, the sampled signal waveform storage 56 stores waveforms that are predefined based on the transmission bandwidth that is desired in connection with the transmission. In one embodiment, the waveforms have, for example, a bandwidth in a range of 0.25 to 1.0 kHz. In another embodiment, the waveforms are band limited signaling waveforms such as, for example, root raised cosine waveforms. In another embodiment, the waveforms consist of the sum of multiple, low-bandwidth component waveforms, each of which is modulated at a different frequency. This sum may have bandwidths as high as 1.2 MHz. The storage device 58 is also connected to a digital-to-analog converter 60 that converts digital data from the storage device 58 to an analog signal. The digital-to-analog converter 60 is connected to a wideband RF modulator and transmitter 62 that receives, modulates and transmits the received analog signals.

In one representative embodiment of operation, digital signal processor 54 constructs and modulates a sampled baseband signal by combining the data stored in the message source 52 and the sampled signal waveform storage 56. In one embodiment, the digital signal processor 54 constructs and modulates the sampled baseband signal using multi-tone modulation (MTM) techniques. The MTM techniques allocate signaling energy into tones of different frequencies that are evenly spaced. As a result, the resulting MTM signaling waveforms are spread spectrum signals wherein the signal bandwidth, i.e., the bandwidth from the lowest frequency tone to the highest, exceeds the information bandwidth conveyed by the transmission. The baseband signals constructed and modulated by the digital signal processor 54 are supplied to the storage device 58. Under the control of digital signal processor 54, the storage device 58 supplies the baseband signals to digital-to-analog converter 60. The analog signals that are output by digital-to-analog converter 50 is modulated and transmitted by the wideband RF modulator and transmitter 62. The RF modulator and transmitter 62 modulates and transmits the analog signal in the AM frequency band.

Figure 3:
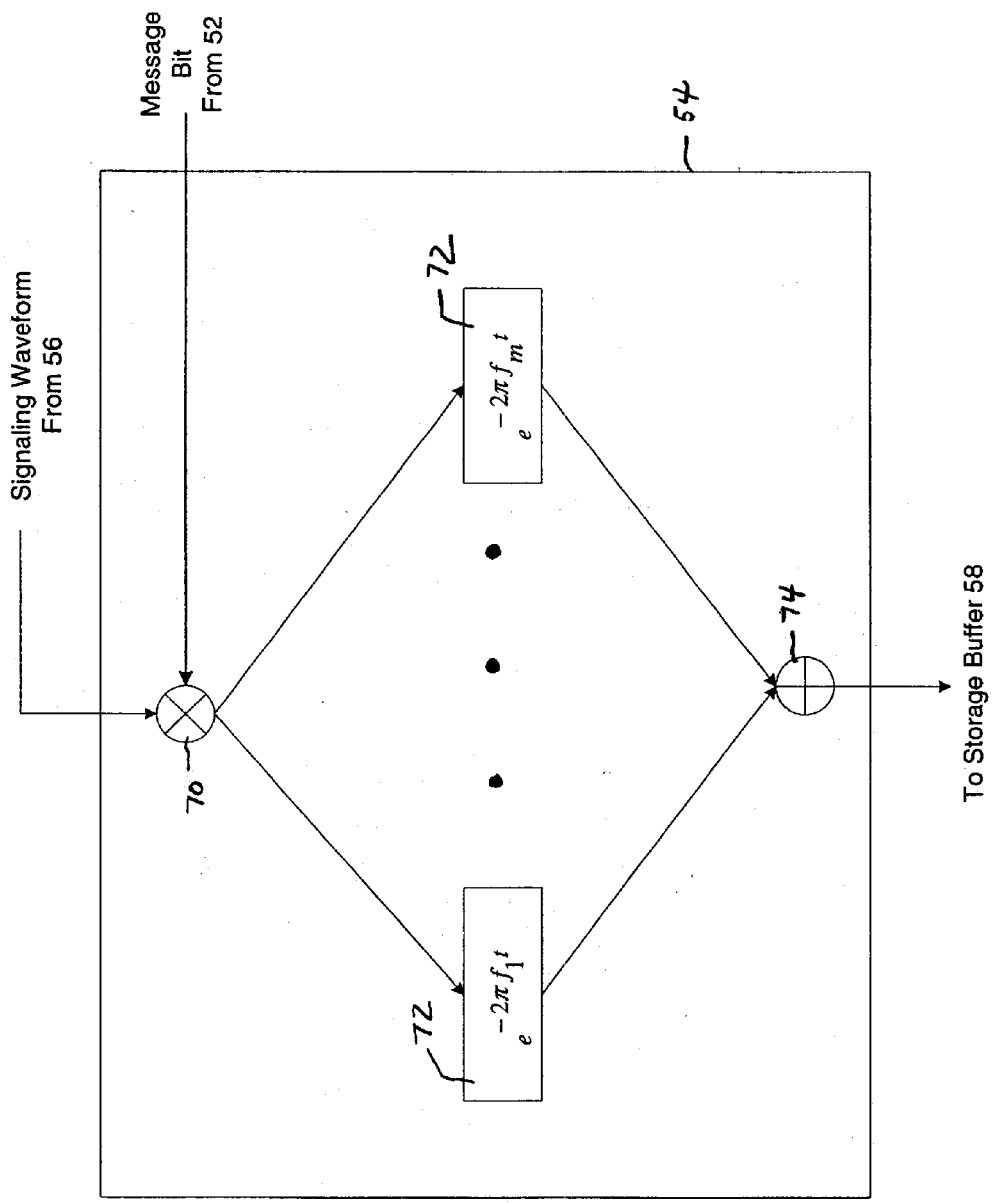
FIG. 3 is a highly simplified block diagram view of one representative embodiment of a digital signal processor.

In FIG. 3, one representative embodiment of a highly simplified digital signal processor 54 includes a multiplier 70 connected to at least one modulator 72. The multiplier 70 is connected to the sampled signal waveform storage 56 to receive a signaling waveform therefrom, and the multiplier 70 is also connected to the message storage 52 to receive a message bit therefrom. A summer 74 is connected to the modulator 72. In FIG. 3, in one embodiment, the digital signal processor 54 is shown to comprise the elements including a multiplier 70, at least one modulator 72 and a summer 74, and it should be appreciated that in another embodiment, these elements may comprise programmed functions executed by the digital signal processor 54, such as, for example a multiplier subroutine, a modulating subroutine and/or a addition subroutine.

In one embodiment of operation, the digital signal processor 54 obtains the message bit from message source 52, and a signaling waveform from the sampled signal waveform storage 56. The multiplier 70 of the digital signal processor 54 multiplies the message bit and the signaling waveform. The product from the multiplier 70 is provided to the modulator 72 that modulates 72 the product into multiple frequencies. In one embodiment, the product from the multiplier 70 is modulated to a first MTM frequency by the modulator 72 that multiplies the product by a first complex sinusoid corresponding to a first MTM frequency $$(e^{-2\pi f_1 t})$$

and the product is modulated up to the $m^{th}$ MTM frequency by multiplying the product by an $m^{th}$ complex sinusoid $$(e^{-2\pi f_m t})$$

corresponding to the $m^{th}$ MTM frequency. The number of MTM frequencies "m" selected for modulation varies depending upon the processing capacity of digital signal processor 54 and the desired final transmission bandwidth. In one embodiment, the number of MTM frequencies ranges from about 8 to 32, inclusive. In another embodiment, the MTM frequencies are situated midway between the AM broadcast station frequencies that are separated by a minimum of 10 kHz. As a result of the modulation by the modulator 72, multiple tones are produced over a selected baseband frequency range, all of which are modulated by the same data. The multiple tones produced by the modulator 72 are added by a summer 74. The addition of the multiple tones by the summer 74 generates a composite wideband signal having multiple number of tones modulated by the same data (such as, for example, the message bit from the message source 52). As such, the composite wideband signal carries one message at multiple carrier frequencies. In another embodiment, the multiple signaling waveforms are multiplied by the bits of a code word representing one or more information bits. Each bit of the code word controls the relative phase of one of the multiple tones summed together to form the wideband signal. A suitable code for this application is any one of the Reed-Muller codes. In other embodiments, other error control codes of the type known as block codes may be employed.

Further, as shown in FIG. 2, the wideband RD modulator and transmitter 62 receive the composite wideband signal in analog form, and the wideband RD modulator and transmitter 62 modulates the wideband signal around a center frequency within the AM band. The AM band extends from 510 kHz to 1705 kHz. As described hereinabove, typically, AM broadcast radio stations licensed by the Federal Communication Commission (FCC) are spaced at least about 10 kHz apart with no guard bands. In one representative embodiment, the modulation frequency comprises 1 MHz (1000 kHz). In this embodiment, the transmitter 62 transmits the modulated baseband signal, the bandwidth of which is approximately 1 MHz. By selecting the carrier frequencies to be midway between the AM broadcast radio station frequencies (every 5 kHz interval between the 10 kHz spaced AM broadcast radio stations), the carrier frequencies minimize interference from existing AM broadcast ratio stations.

Figure 4:
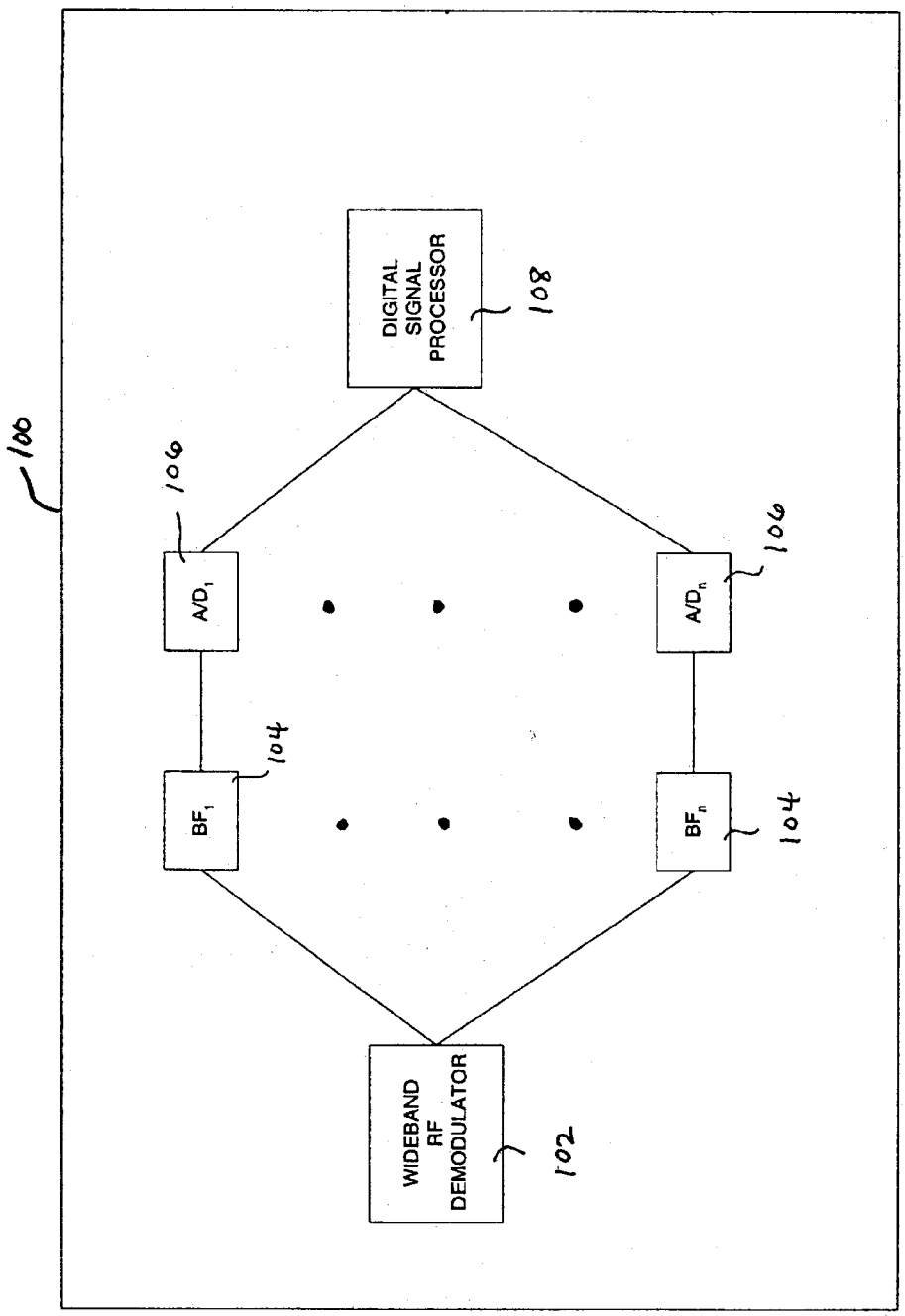
FIG. 4 is a block diagram of one representative embodiment of a receiver.

In FIG. 4, a receiver 100 includes a wideband RF demodulator 102 connected to at least one bandpass filter 104, and at least one analog-to-digital converter 106 is connected to each of the band pass filters 104 and a digital signal processor 108. In one embodiment, at least one receiver 100 is included in each of the central control station 20, radio tower 22, and nodes 24 of the communication system 10 (FIG. 1). In other representative embodiments, the digital signal processor 108 comprises a processor, such as, for example, a general purpose computer or a microprocessor. It should be appreciated that the digital signal processor 108 encompasses all processors that are suitable for use in connection with radio frequency (RF) signaling. In one embodiment, when the receiver 100 is included in the central control station 20, the receiver 100 receives data transmitted from at least one of the radio tower 22, the node 24 or the meter device 16. In another embodiment, when the receiver 100 is included in the radio tower 22, data is received from at least one of the central control station 20, the node 24 or the meter device 16. In even another embodiment, when the receiver 100 is included in the node 24, data is received from at least one of the central control station 20, the radio tower 22 or the meter device 16. In yet another embodiment, when the receiver 100 is included in the meter device 16, data is received from at least one of the central control station 20, the radio tower 22 or the node 24. It should be appreciated that the receiver 100 can also comprise an antenna (not shown) to assist in receiving the RF signals.

In one embodiment, the bandwidth of the wideband RF demodulator 102 is selected to encompass all, or at least part of, the AM band. Each of the at least one bandpass filters 104 are selected to pass only signals having a particular frequency. In one embodiment, the carrier frequencies of the receiver 100 are selected to be midway between the AM broadcast radio station frequencies (every 5 kHz interval between the 10 kHz spaced AM broadcast radio stations). The bandpass filters 104 are selected to pass signals having frequencies corresponding to the respective carrier frequencies and/or a plurality of carrier frequencies. In one embodiment of operation, transmitted RF signals are received in analog format and demodulated using the wideband RD demodulator 102. The demodulated signals are filtered by the at least one bandpass filter 104. The filtered signals are converted to digital data by the at least one analog-to-digital converters 106. The digital signal processor 108 samples the digital data. For each sample cycle, the digital signal processor 108 obtains "n" separate signals at "n" frequencies and each of the "n" signals is modulated by the same data (such as, for example, the message bit from the message source 52). Thus, in one embodiment, the digital data is constructed (by demodulation) to form received utility data that can be interpreted by, for example, a meter device 16, a node 24, a radio tower 22 or a central control station 20.

Figure 5:
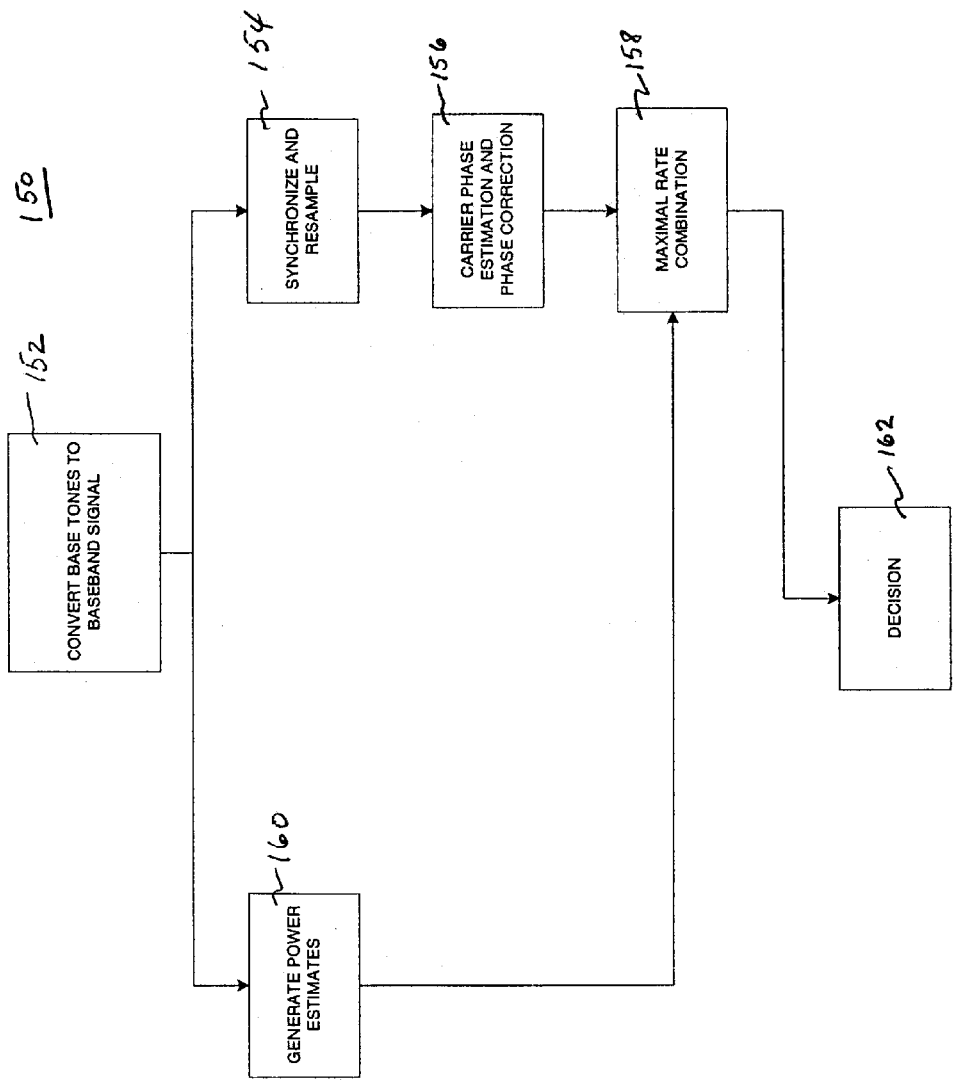
FIG. 5 is a flow chart of one representative embodiment of a process executed by a digital signal processor of a transmitter.

In FIG. 5, one embodiment of a method 150 performed by the digital signal processor 108 is provided. In the method, the digital signal processor 108 converts the digital signals from "n" tones to "n" baseband level signals (step 152). The power level of the "n" baseband level signals is estimated (step 160). The "n" baseband level signals are also synchronized to a timing signal and resampled (step 154) to obtain a single sample at a peak signal-to-noise ratio (SNR) using, for example, an early-late gate synchronization. Then, the carrier phase is estimated to perform coherent reception, and the phase is the phase of the sample is corrected by multiplying the baseband sample by a phasor (step 156). A maximal ratio combination is performed (step 158). In one embodiment, the maximal ratio combination is performed to maximize the signal-to-noise ratio (SNR) of the receiver 100. The data is used to make a decision (step 162), such as, for example, a logical zero as an output or a logical one as an output. In one embodiment, the decision (step 162) compares the processed sample to a threshold value. If the sample equals or exceeds the threshold value, a logical one is output as an indication that the chosen carrier frequency has an acceptable signal-to-noise level, and if the sample is less than the threshold value, then a logical zero is output as an indication that the chosen carrier frequency does not have an acceptable signal-to-noise ratio. In another embodiment, the set of received tones are combined using phases specified by one of a number of possible transmitted code words. The code word yielding the largest energy after such combination is chosen, and the information bit or bits corresponding to that code word are thereby recovered from the received signal.

In one embodiment, used to eliminate a need for frequency agility and for data-link layer synchronization of the transmitter 50 and receiver 100 during a search for a clear channel, the transmitter 50 and the receiver 100 utilize MTM modulation in the AM frequency band. In this embodiment, at the transmitter 50, multiple carriers at frequencies situated midway between the AM radio broadcast station frequencies (every 5 kHz interval between the 10 kHz spaced AM broadcast radio stations) are utilized. As stated herein, these carrier frequencies minimize interference from existing AM radio broadcast stations. In addition, in one embodiment of a two-way communication system, feedback (decision output from step 162 from receiver 100 is provided to transmitter 50. This feedback reflects the state of the receiver 100. Using this feedback, the transmitter 50 can concentrate power into frequencies where the signal-to-noise ratio is acceptable. Further, as an example in this embodiment, communication is initiated between the transmitter 50 and the receiver 100 using an open-loop MTM scheme. Then, the communications is adapted into a frequency agility scheme while still retaining the broadest bandwidth consistent with the acceptable overall signal-to-noise ratio. This communication scheme reacts to a degradation of the signal-to-noise ratio in some subset of the bands used for transmission by falling back on the MTM scheme.

In one embodiment, the receiver 100 and transmitter 50 are useful in connection with AMR applications, and especially for communications with power devices, e.g., for controlling relays or switches, and for obtaining metering data from meter devices 16 electrically connected to power lines 18. In one embodiment of a one way communication system, the receiver 100 is located in at least one of the central control station 20, the radio tower 22 or the node 24, and each meter device 16 includes a transmitter 50. It should be appreciated that the commands and data transmitted between the meter devices 16, the plurality of nodes 24, the radio tower 22 and the central control station 20 can also be termed transmitted information and/or received information.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A communication system for communicating information from a utility distribution network, the communication system comprising:
   a transmitter for transmitting the information, the transmitter comprising:
      a digital signal processor modulating the information into a plurality of carrier frequencies;
      a digital-to-analog converter connected to the digital signal processor for converting the modulated information into an analog signal; and
      a wide band radio frequency (RF) modulator connected to the digital-to-analog converter and receiving the analog signal, the wide band RF modulator modulating the analog signal in an AM frequency band wherein the multi-tone modulated analog signal is transmitted in the AM frequency band by the transmitter wherein the transmitted multi-tone modulated analog signal comprises transmitted information;
   a receiver for receiving the transmitted information from the transmitter, the receiver comprising:
      a wide band radio frequency (RF) demodulator for receiving the transmitted information, the wide band RF demodulator demodulating the transmitted information into a received analog signal;
      an analog-to-digital converter connected to the wide band RF demodulator for converting the received analog signal to received digital data; and
      a digital signal processor connected to the analog-to-digital converter and receiving the received digital data, the digital signal processor constructing the received digital data and forming received information.

2. The communication system of claim 1 wherein the digital signal processor of the transmitter modulates the information using multi-tone modulation.

3. The communication system of claim 1 wherein the transmitter further comprising a storage device connected to the digital signal processor for storing a sampled signal waveform and wherein the information comprises a message bit.

4. The communication system of claim 3 wherein the digital signal processor of the transmitter further comprising:
   a multiplier connected to the storage device for multiplying the sampled signal waveform with the message bit to form a product output;
   at least one modulator connected to the multiplier wherein the at least one modulator uses a plurality of complex sinusoids corresponding to a plurality of multi-tone modulation frequencies to modulate the product output into the plurality of carrier frequencies; and
   a summer connected to each of the at least one modulators for adding each of the modulated product outputs together to generate a wideband signal having a plurality of tones modulated by the message bit.

5. The communication system of claim 4 wherein the signaling waveform has a bandwidth between about 0.25 kHz and 1.0 kHz.

6. The communication system of claim 4 wherein the plurality of carrier frequencies ranges between about 8 to 32 frequencies and each of the plurality of multi-tone modulation frequencies being situated midway between AM radio broadcast frequencies.

7. The communication system of claim 1 wherein the wide band RF modulator of the transmitter modulates the analog signal in a frequency midway between AM radio broadcast frequencies.

8. The communication system of claim 1 wherein the transmitter further comprising a storage device connected between the digital signal processor and the digital-to-analog converter for storing the modulated information.

9. The communication system of claim 1 wherein the receiver further comprising at least one bandpass filter connected to the wide band RF demodulator for filtering the received analog signal.

10. The communication network of claim 9 wherein each at least one bandpass filter passes a signal corresponding to one of the plurality of carrier frequencies.

11. The communication system of claim 1 wherein wide band RF demodulator demodulates the transmitted AM modulated analog signal in at least part of the AM frequency band.

12. The communication system of claim 1 wherein the receiver provides feedback to the transmitter indicative of a signal to noise ratio of the AM band frequency in which the analog signal is modulated and transmitted.

13. The communication system of claim 1 wherein the transmitter further comprising an antenna connected to the digital signal processor and wherein the receiver further comprising an antenna connected to the wide band RF demodulator.

14. A communication system for communicating information, the communication system comprising:
   a transmitter for transmitting the information, the transmitter comprising:
      a processor modulating the information into a plurality of carrier frequencies; and
      a modulator connected to the processor and receiving the modulated utility data, the modulator modulating the modulated utility data in an AM frequency band forming multi-tone modulated data wherein the multi-tone modulated data is transmitted in the AM frequency band by the transmitter and the transmitted multi-tone modulated data comprises transmitted information;
   a receiver for receiving information from the transmitter, the receiver comprising:
      a demodulator for receiving the transmitted information, the demodulator demodulating the transmitted information into a received signal; and
      a processor connected to the demodulator and receiving the received signal, the processor constructing the received signal and forming received information.

15. The communication system of claim 14 wherein the processor of the transmitter comprises a digital signal processor and wherein the transmitter further comprising a digital-to-analog converter connected between the digital signal processor and the modulator for converting the modulated utility data into an analog signal.

16. The communication system of claim 15 wherein the processor of the receiver comprises a digital signal processor and wherein the receiver further comprising an analog-to-digital converter connected between the demodulator and the digital signal processor for converting the received signal into received digital data.

17. The communication system of claim 16 wherein the transmitter further comprising a storage device connected to the processor for storing a sampled signal waveform and wherein the information comprises a message bit.

18. The communication system of claim 17 wherein the digital signal processor of the transmitter further comprising:

a multiplier connected to the storage device for multiplying the sampled signal waveform with the message bit to form a product output;

at least one modulator connected to the multiplier wherein the at least one modulator uses a plurality of complex sinusoids corresponding to a plurality of multi-tone modulation frequencies to modulate the product output into the plurality of carrier frequencies; and a summer connected to each of the at least one modulators for adding each of the modulated product outputs together to generate a wideband signal having a plurality of tones modulated by the message bit.

19. The communication system of claim 18 wherein the signaling waveform has a bandwidth between about 0.25 kHz and 1.0 kHz.

20. The communication system of claim 18 wherein the plurality of carrier frequencies ranges between about 8 to 32 frequencies and each of the plurality of multi-tone modulation frequencies being situated midway between AM radio broadcast frequencies.

21. The communication network of claim 18 wherein the receiver further comprising at least one bandpass filter connected between the demodulator and the analog-to-digital converter for filtering the received signal.

22. The communication network of claim 21 wherein each at least one bandpass filter passes a signal corresponding to one of the plurality of carrier frequencies.

23. The communication system of claim 14 wherein demodulator demodulates the transmitted information in at least part of the AM frequency band.

24. The communication system of claim 14 wherein the modulator of the transmitter modulates the information in a frequency midway between AM radio broadcast frequencies.

25. The communication system of claim 14 wherein the receiver provides feedback to the transmitter indicative of a signal to noise ratio of the AM band frequency in which the information is modulated and transmitted.

26. The communication system of claim 14 wherein the transmitter further comprising an antenna connected to the processor and wherein the receiver further comprising an antenna connected to the demodulator.

27. The communication system of claim 14 wherein the processor of the transmitter modulates the information using multi-tone modulation.

* * * * *